United States Patent [19]

Jones

[11] Patent Number: 5,684,244
[45] Date of Patent: Nov. 4, 1997

[54] INERTIAL BANK ANGLE SENSOR

[76] Inventor: Jerry Jones, 341 Jean St., Mill Valley, Calif. 94941

[21] Appl. No.: 433,796

[22] Filed: Apr. 27, 1995

Related U.S. Application Data

[63] Continuation-in-part of Ser. No. 29,767, Mar. 11, 1993, Pat. No. 5,426,571.

[51] Int. Cl.$^6$ ............................................. B62J 6/00
[52] U.S. Cl. .................... 73/1 E; 362/71; 362/72
[58] Field of Search .................. 73/1 E, 1 D; 33/335, 33/343, 349, 365, 366; 362/71, 72

[56] References Cited

U.S. PATENT DOCUMENTS

| | | | |
|---|---|---|---|
| 4,606,133 | 8/1986 | Mills | 33/366 |
| 4,868,720 | 9/1989 | Miyauchi et al. | 362/71 |
| 4,870,545 | 9/1989 | Hatanaka et al. | 362/72 |

FOREIGN PATENT DOCUMENTS

| | | | |
|---|---|---|---|
| 0010109 | 1/1985 | Japan | 33/365 |
| 0268211 | 11/1990 | Japan | 33/343 |

*Primary Examiner*—Robert Raevis

[57] ABSTRACT

In order to determine the direction and degree of bank of a motorcycle, a flywheel or other weight balanced at its center of mass is mounted on the motorcycle so that it is free to rotate about an axis parallel to the longitudinal axis of the motorcycle. As the vehicle banks, the flywheel will tend to maintain its position, and the angle of bank can be ascertained by measuring the direction and degree of rotation between the plane of the motorcycle and the flywheel. Measurement of flywheel rotation is obtained by means of an electromagnetic or electro-optical scanner. Because of friction and vibration, however, the flywheel position will drift relative to the horizon, rendering the angle measurement inaccurate. Therefore it is necessary to correct for flywheel drift periodically whenever the vehicle is upright or normal to the road surface. The zero bank angle, or upright position, for the motorcycle is determined by one or more distance sensors, or by detecting a zero steering angle, using a suitable rotary switch between the frame and the fork assembly.

7 Claims, 5 Drawing Sheets

INERTIAL BANK ANGLE SENSOR

This application is a continuation-an-part of application, Ser. No. 08/029,767, filed Mar. 11, 1993, now U.S. Pat. No. 5,426,571.

BACKGROUND—FIELD OF INVENTION

The Inertial Bank Angle Sensor can be used to determine the angle of bank of a motorcycle, bicycle, boat or other objects which tilt. Measurement of the bank angle can be useful in optimizing various functions, such as lighting, power delivery, braking force, camera-mount positioning, turn signal actuation, etc.

BACKGROUND—DISCUSSION OF PRIOR ART

Prior art means for bank angle measurement have used gyroscopic sensors, G-force measurement, vehicle speed combined with steering angle, and radiation reflected from the road surface to determine the attitude of the vehicle. Problems with the first three methods are described in detail in the co-pending application, Ser. No. 08/029,767. Briefly, gyro sensors are costly and complex, and G-force measurements are subject to gross inaccuracies due to bumps and other terrain variables. Speed and steering angle cannot be used to derive the bank angle because "countersteering", used to initiate a turn, would indicate a bank angle opposite to the true one. On a series of S curves, a bank angle thus derived would be wrong most of the time.

Reflected radiation when used to measure distance from the road surface is generally reliable, but when propagated at an acute angle to the road surface may produce a very weak return signal In addition, when propagated from the low side of a sharply banked vehicle the radiation may be doubly reflected, once from the road and then from some part of the vehicle itself. Similarly, when propagated from the high side of a banking vehicle, the radiation may be reflected from curbs, fences, and other vehicles, which would severely compromise the accuracy of the measurement.

OBJECTS AND ADVANTAGES

Accordingly, an the object of the Inertial Bank Angle Sensor is to provide a simple and far more reliable means of determining the vehicle bank angle.

SUMMARY

The Inertial Bank Angle Sensor uses a freewheeling flywheel mounted on a banking vehicle so that the flywheel's axis of rotation is parallel to the direction of vehicle travel. As the vehicle tilts or banks, the flywheel will tend to maintain its position relative to the horizon. A scanning device which banks with the vehicle can be used to measure the bank angle relative to the flywheel.

Any changes in flywheel position due to friction or vibration, which I shall call flywheel drift, can be corrected for by taking a baseline reading of flywheel speed and direction whenever the vehicle is determined to be in a steady upright position. This determination is made by a detector using radiation reflected off the road surface or by detecting a null steering angle.

LIST OF REFERENCE NUMERALS

10. Flywheel Assembly
11. Bearing
12. Light Source
13. Flywheel
14. Perforations
15. Axle
16. Electro-Optical Detectors
17. Housing
18. Distance sensor
19. Microprocessor

Description

Figure 1:
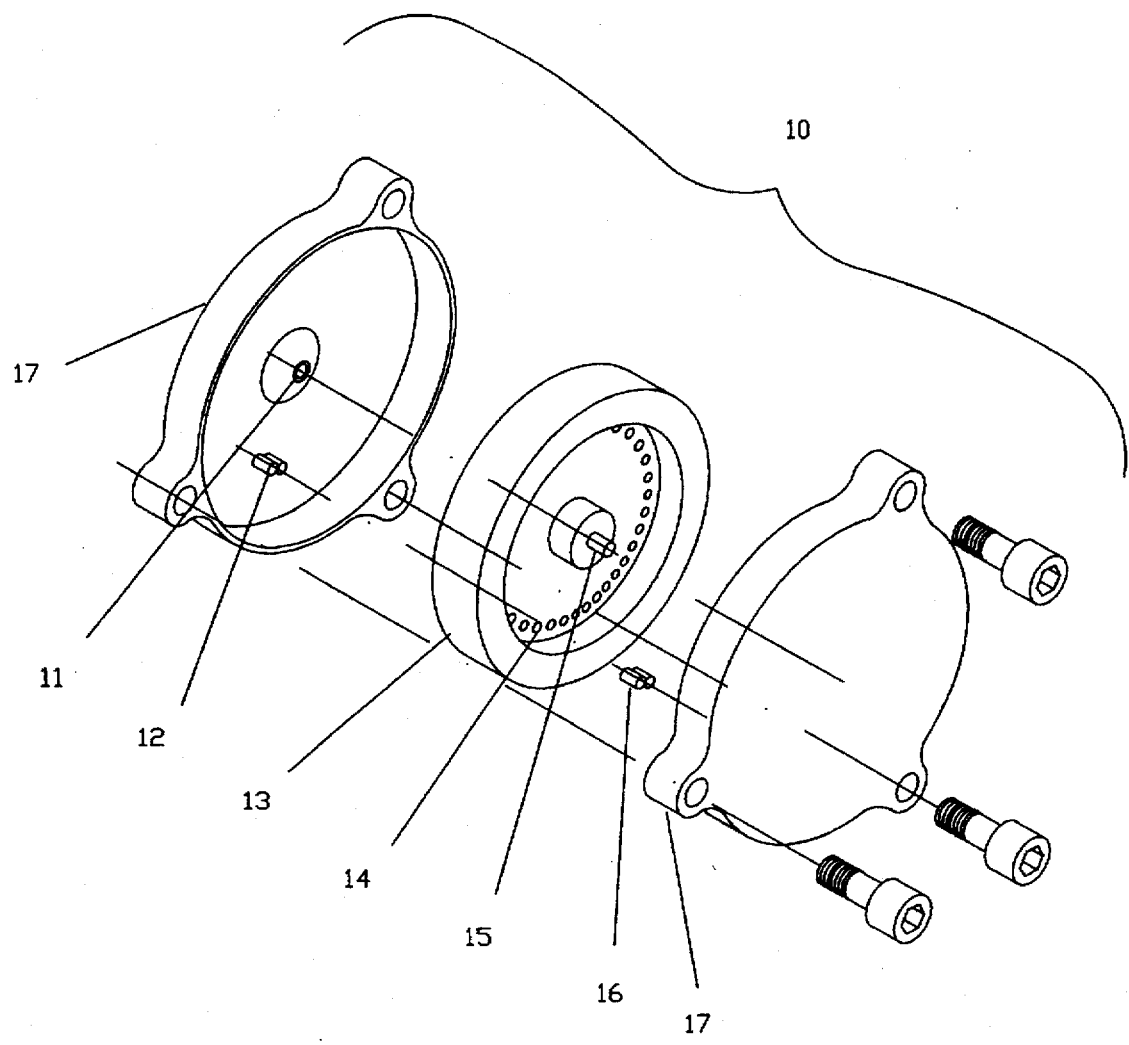
FIG. 1 is an exploded view of the flywheel assembly including the flywheel, housing, and emittor/detector pairs.

FIG. 1 shows a flywheel (13) free to rotate within a casing or housing (17) which is mounted on a motorcycle with the axis of Flywheel total ion parallel to the longitudinal axis of the motorcycle. The flywheel is perforated with a series of equidistant holes (14) at a predetermined radius.

Figure 3:
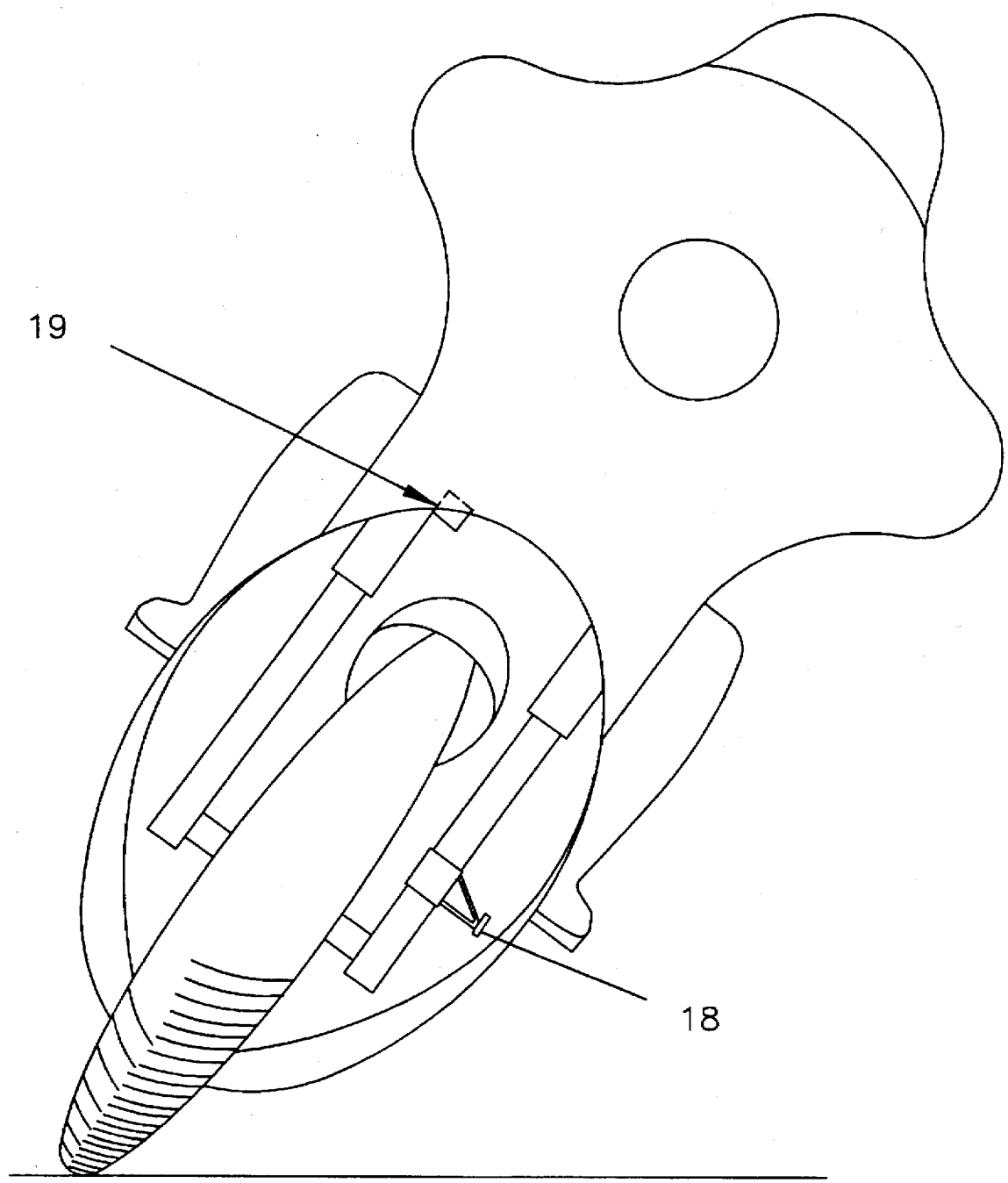
FIG. 3 is a view of a motorcycle showing the position of the processing unit and a single radiation emittor/sensor unit.
Figure 4:
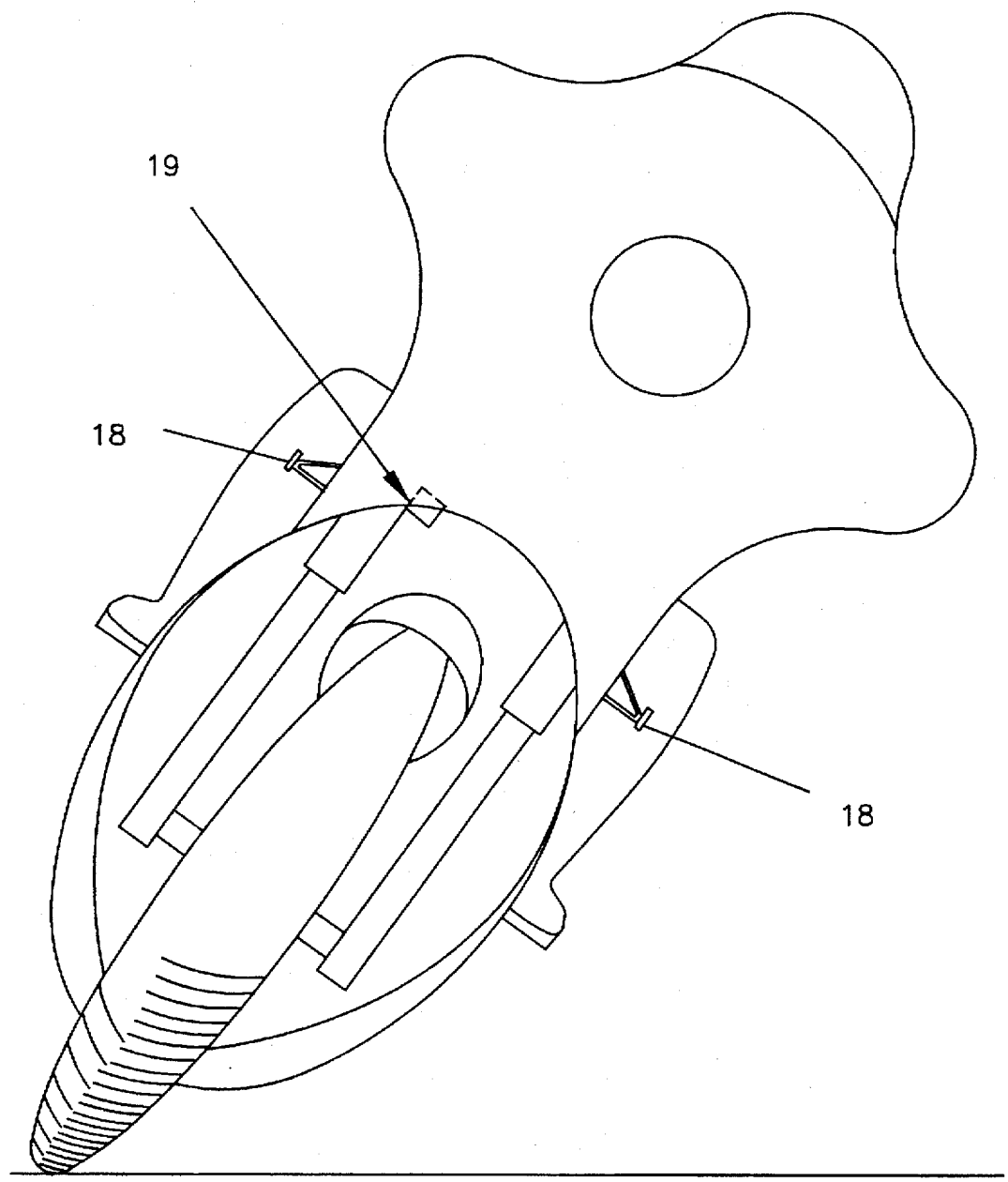
FIG. 4 is a view of a motorcycle showing the position of the processing unit and a single radiation emittor/sensor unit.
Figure 5:
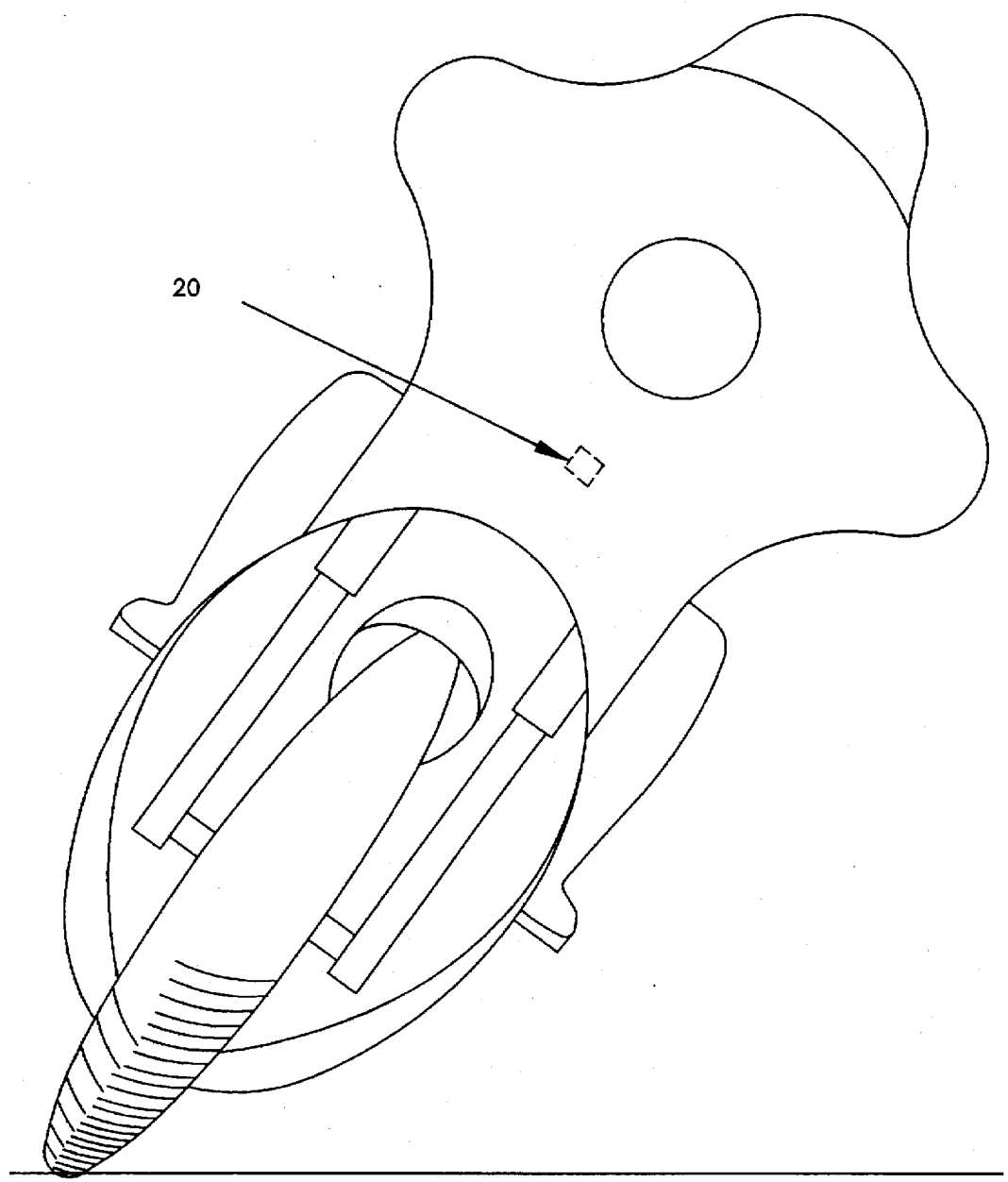
FIG. 5 is a view of a motorcycle showing the position of the processor unit and dual radiation emittor/sensor units.

Two electro-optical detectors (16) are mounted to one half of the housing so that light passing through the perforations will produce an electrical signal in each detector. The light, is produced by a light source (12) suitably positioned on the other half of the housing. The signal from each detector is fed to a processing unit (microprocessor) (19) which may be mounted where convenient as shown in FIG. 3.

The signal from a 0 bank angle detector is also fed into the processing unit. The 0 bank angle detector can use single or dual distance sensors as described in the co-pending application, Ser. No. 08/029,767, or use a rotary switch mounted to the steering head to signal a zero steering angle.

Operation of invention

As the vehicle banks, the flywheel will tend to maintain its position, and the angle of bank can be ascertained by measuring the direction and degree of rotation between the plane of the motorcycle and the flywheel. Measurement of flywheel rotation is obtained through either an electromagnetic or an electro-optical scanning device.

One embodiment, illustrated in FIG. 1 shows a flywheel (13) with a circular array of perforations (14) inside a housing (17) which encloses the flywheel and supports the flywheel axle (15). This housing is mounted to the motorcycle where convenient, with the flywheel axis parallel to the longitudinal axis of the motorcycle.

Two LED emittors (12) with corresponding electro-optical detectors (16) are positioned on opposite sides of the flywheel so that the flywheel perforations can allow light from the LEDs to be transmitted to the detectors.

Figure 2:
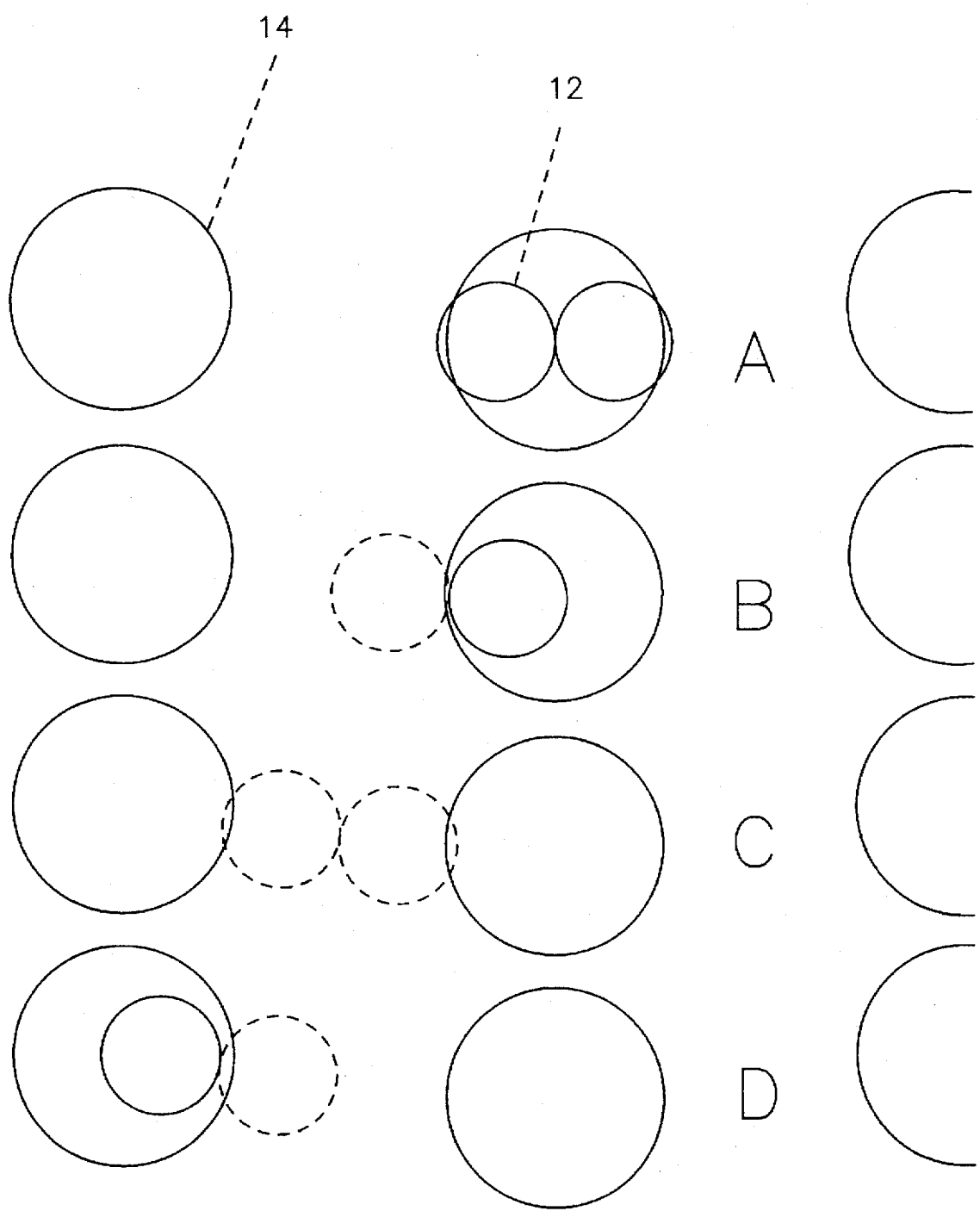
FIG. 2 is a schematic view showing the four possible positions of the optical sensors relative to the flywheel perforations.

FIG. 2 shows schematically how the position of the emittors (12) relative to the perforations (14) produces one of four possible combinations of light transmission (A or B or C or D) to the corresponding detectors, which are not shown, but are positioned exactly opposite the emittors on the near side of the perforated flywheel.

A change from A to B, B to C, C to D, or D to A indicates movement in one direction. A change from A to D, D to C, C to B, or B to A indicates movement in the other direction. Clearly, the frequency of these changes is proportional to the relative speed between the flywheel and the emittor/detector pairs.

Because of friction and vibration, however, the flywheel position will not remain constant relative to the horizon, but will tend to drift in one direction or the other, rendering the angle measurement inaccurate. Therefore it is necessary to periodically correct the angle measurement whenever the motorcycle is upright or normal to the road surface ( 0 bank angle ).

The 0 bank angle, or upright position, for the motorcycle is determined by one or more distance sensors as described in the co-pending application, Ser. No. 08/029,767 which use the time for a series of emitted radiation pulses to travel to the road surface (where they are reflected) and return to the sensor in order to measure the distance from the sensor to the road surface. This function could use one distance sensor (18) aimed down at the road and mounted to an unsprung component at one side of the motorcycle centerline as depicted in FIG. 3. Whenever the distance matches a predetermined value, the motorcycle will be in an upright position.

A second method uses two distance sensors, symmetrically mounted equidistant from the motorcycle centerline at any point on the vehicle, allowing the sensors to be mounted to a sprung component. Whenever the distance values are equal, the motorcycle is upright.

A third method measures the steering angle. Whenever the steering angle is 0 degrees (when the two wheels are in the same plane) for a predetermined time, the motorcycle can be assumed to be in an upright position. A 0 degree steering angle can be detected by using a suitable rotary switch between the frame and the fork assembly.

The first two of these methods are essentially different from those used in the prior art, because they are not used to measure the bank angle, but only to detect when the vehicle is upright. When the vehicle is upright, the radiation path is normal to the road surface, providing optimal reflectivity. Moreover, the electronic means for detecting one predetermined distance is less complex than that required to measure a range of distances, and can be outputted as a simple binary (on/off) signal.

Similarly, the third method is different from steering angle measurement as discussed in the prior art, since this measurement is only used to detect an upright position and can be achieved with a rotary switch which allows an electric current to flow only when the steering angle is zero. Note that errors produced by countersteering in the cited prior art do not apply when the steering angle is zero. A further difference is that no vehicle speed input is required.

Given a high ratio of inertia to bearing friction, flywheel rotation induced by friction and vibration will change very slowly over time. Any real-world driving conditions would include sufficient periods of straight or upright travel to render any inaccuracy due to this rotation insignificant.

In order to measure the bank angle, then, we first need to measure the speed and direction of flywheel movement when the vehicle is upright. This involves using a sample of flywheel movement data taken within a longer sample period of 0 bank angle in order to eliminate any inaccuracy caused by transient measurements, e.g. measurements made at the beginning or end of a period of upright travel. Also, if the motorcycle were banked from one side to the other without maintaining a brief intermediate upright position, the flywheel speed data at an instantaneous 0 bank angle would differ from that obtained at a steady upright position.

At every period of upright travel, the duration of which could be less than a second, the speed and direction of the flywheel relative to the motorcycle would be determined, and this data would be entered as a 0 bank angle. Subsequent variations from this 0 bank angle baseline measurement would be used to derive the bank angle until the distance sensor(s) or steering angle switch indicate another period of 0 bank angle. Bank angle data thus derived by the processing unit would be used to rotate arid pivot one or more, headlamps by means of a servo-motor or stepper-motor as described in the co-pending application, Ser. No. 08/029, 767.

Conclusion, Ramification and Scope of Invention

The above description should not be construed as a limitation on the scope of the Inertial Bank Angle Sensor, but rather as an exemplification of one preferred embodiment thereof. Many other variations are possible.

In order to minimize bearing friction in the preferred embodiment, especially if using plain bearings as illustrated, the flywheel axle should be as small in diameter as possible. In order to prevent damage to the axle, the flywheel housing would be shock-mounted.

An equal-arm or parallelogram linkage arranged to allow vertical movement (with the motorcycle upright) would prevent any rotary movement of the housing which could affect the bank angle measurement. Simple rubber bushings at the linkage pivots would allow some movement in response to shock or vibratory excursions in other directions.

A further improvement consists of a series of small headlamp assemblies configured to fit the headlamp shells or mounts of popular motorcycle models, comprising one or more high and low beam units. These assemblies could contain the flywheel unit, as well, enabling quick and easy installation, with only one external electrical lead to the zero bank angle detector. The degree to which the headlight beam pivots on an axis normal to the road surface is determined by the position of the pin or pivot point, as described in the co-pending application, Ser. No. 08/029,767. In a new embodiment these pins or pivot points are fixed in a predetermined position. The low beam assemblies have the pin positioned so that there is more pivoting movement at any given angle of bank than the high beam. By this simple means, a rough vehicle speed input consists of the driver's choice of high or low beam.

I claim:

1. A device for measuring the bank angle of banking vehicles comprising:

(a) a flywheel free to turn on an axis parallel to the direction of movement of said vehicle (b) measuring means to measure the rotational speed and direction of rotation of said flywheel (c) detecting means to determine whenever said vehicle is in an upright position (d) data processing means to derive a bank angle output from data from said rotation measuring means and said upright position detecting means.

2. The bank angle sensor of claim 1 wherein the rotation of said flywheel relative to said vehicle is measured by electromagnetic means.

3. The bank angle sensor of claim 1 wherein the rotation of said flywheel relative to said vehicle is measured by electro-optical means.

4. The bank angle sensor of claim 1 wherein the upright orientation of said vehicle is detected by means of radiation pulses reflected from the road surface.

5. The bank angle sensor of claim 4 wherein the upright orientation of said vehicle is detected by means of radiation pulses emitted downward from a source mount to one side of an unsprung component of said vehicle and detected by a radiation detector similarly mounted.

6. The bank angle sensor of claim 4 wherein the upright orientation of said vehicle is detected by means of two radiation detectors symmetrically mounted on each side of the vehicle centerline.

7. The bank angle sensor of claim 4 wherein the upright orientation of said vehicle is detected by means of an electrical signal activated when the steering angle is zero.

* * * * *

UNITED STATES PATENT AND TRADEMARK OFFICE
CERTIFICATE OF CORRECTION

PATENT NO. : 5,684,244
DATED : November 4, 1997
INVENTOR(S) : Jerry Jones

It is certified that error appears in the above-identified patent and that said Letters Patent is hereby corrected as shown below:

Column 2, line 29, change "Flywheel total ion" to --flywheel rotation--

Signed and Sealed this

Thirteenth Day of January, 1998

Attest:

BRUCE LEHMAN

Attesting Officer

Commissioner of Patents and Trademarks